United States Patent
Brown et al.

(10) Patent No.: US 11,256,481 B2
(45) Date of Patent: Feb. 22, 2022

(54) SOFTWARE DEVELOPMENT ENVIRONMENT WITH COMPILATION AND READ-EVALUATE-PRINT-LOOP OPERATIONS

(71) Applicant: Apple Inc., Cupertino, CA (US)

(72) Inventors: Alexander B. Brown, Mountain View, CA (US); Kenneth S. Orr, Morgan Hill, CA (US); Matthew M. Patenaude, San Jose, CA (US); Murat N. Konar, Emeryville, CA (US); Patrick R. Holley, Mountain View, CA (US); Samuel C. Page, San Francisco, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 16/423,452

(22) Filed: May 28, 2019

(65) Prior Publication Data

US 2019/0369968 A1 Dec. 5, 2019

Related U.S. Application Data

(60) Provisional application No. 62/679,877, filed on Jun. 3, 2018.

(51) Int. Cl.
*G06F 8/41* (2018.01)
*G06F 8/34* (2018.01)
*G06F 11/36* (2006.01)

(52) U.S. Cl.
CPC ............... *G06F 8/34* (2013.01); *G06F 8/41* (2013.01); *G06F 11/362* (2013.01)

(58) Field of Classification Search
CPC ............. G06F 8/34; G06F 8/41; G06F 11/362
See application file for complete search history.

(56) References Cited

U.S. PATENT DOCUMENTS

| 2011/0307872 | A1* | 12/2011 | Stall | G06F 11/362 |
| | | | | 717/129 |
| 2013/0024837 | A1* | 1/2013 | Bienkowski | G06F 11/3664 |
| | | | | 717/109 |

(Continued)

OTHER PUBLICATIONS

S. P. Reiss, Q. Xin and J. Huang, "SEEDE: Simultaneous Execution and Editing in a Development Environment," 2018 33rd IEEE/ACM International Conference on Automated Software Engineering (ASE), 2018, pp. 270-281, doi: 10.1145/3238147.3238182. (Year: 2018).*

(Continued)

*Primary Examiner* — Hanh Thi-Minh Bui
(74) *Attorney, Agent, or Firm* — Womble Bond Dickinson (US) LLP

(57) ABSTRACT

Methods and systems for developing software can perform both compilation operations and read-evaluate-print-loop (REPL) operations on source code. In one embodiment, an integrated development environment can include a source code editor and a compiler and can perform the following operations: receiving source code and performing REPL operations as the source code is received; receiving edits in the source code for which REPL operations have been performed and compiling, by the compiler, the edited source code; and storing results of execution of the edited source code for use in subsequent REPL operations.

13 Claims, 18 Drawing Sheets

(56) References Cited

U.S. PATENT DOCUMENTS

| | | | |
|---|---|---|---|
| 2014/0201236 A1* | 7/2014 | Adler | G06F 16/245 |
| | | | 707/769 |
| 2014/0380272 A1* | 12/2014 | Hertweck | G06F 11/3664 |
| | | | 717/113 |
| 2015/0347094 A1* | 12/2015 | Lattner | G06F 8/42 |
| | | | 717/109 |
| 2015/0378871 A1* | 12/2015 | Asthana | G06F 11/3628 |
| | | | 717/122 |
| 2017/0123762 A1 | 5/2017 | Drukman et al. | |

OTHER PUBLICATIONS

"Project Jupyter", last edited on May 8, 2019, Wikipedia, retrieved from https://en.wikipedia.org/w/index.php?title=Project_Jupyter&oldid=896149570, 6 pages.

* cited by examiner

```
MyPlayground1
  MyPlayground1
  var thousandsOfIntegers = [Int] ()    ~701
  2                         ~703
  3
```

Ready to start MyPlayground1

FIG. 7A

```
┌─────────────────────────────────────────────────────────────────┐
│ ○○○     ⟨Ready to start MyPlayground1⟩    ■ ⊘ ↕  □ □ □          │
├──┬──────────────────────────────────────────────────────────────┤
│⊞ │                                                              │
│⟨⟩│ ▸ ▣ MyPlayground1                                            │
│  │ 1 var thousandsOfIntegers = [Int]()  ～701                    │
│  │ 2                                                            │
│  │ 3 thousandsOfIntegers.append(0)              []              │
│  │ 4 thousandsOfIntegers.append(1)              [0]    ⎱        │
│  │ 5 thousandsOfIntegers.append(2)              [0,1]  ⎰─ 709   │
│  │      ▲▲                                      ()              │
│  │     ╱  ╲                                                     │
│  │   703  707                                                   │
│  │         ╲                                                    │
│  │         705                                                  │
│  │                                                              │
│ ▽│                                                              │
│ ◁│                                                              │
└──┴──────────────────────────────────────────────────────────────┘
```

FIG. 7B

```
MyPlayground1
1  var thousandsOfIntegers = [Int]()    ~701       []
2
3  thousandsOfIntegers.append(0)                   [0]
4  thousandsOfIntegers.append(1)                   [0, 1]
5  thousandsOfIntegers.append(2)                   ()     ~709
6
7
8  thousandsOfIntegers.removeAll()
9
▲
11 for i in 0...<1000|
        ~707
   ~705
```

Ready to continue MyPlayground1

FIG. 7D

```
MyPlayground1
   MyPlayground1                                              701
 1 var thousandsOfIntegers = [Int]()
 2
 3 thousandsOfIntegers.append(0)                  []
 4 thousandsOfIntegers.append(1)                  [0]
 5 thousandsOfIntegers.append(2)                  [0, 1]
                                                  ()          709
 6
 7
 8 thousandsOfIntegers.removeAll()       705
 9
10 for i in 0..<1000 {
11     thousandsOfIntegers.append(i)
12 }
13
   thousandsOIntegers
                        703
              707
```

FIG. 7E

```
MyPlayground1
1  var thousandsOfIntegers = [Int]()        ~701      []
2
3  thousandsOfIntegers.append(0)                      [0]
4  thousandsOfIntegers.append(1)                      [0,1]
5  thousandsOfIntegers.append(2)                      ()
6
7
8  thousandsOfIntegers.removeAll()        ←709        []
9
10 for i in 0..<1000 {
11     thousandsOfIntegers.append(i)                  (1000 times)
12 }
13
14 thousandsOIntegers                                 [0,1,2,3,4,5,6,7,8,9,10,1.
```

FIG. 7F

```
MyPlayground1
 > ▣ MyPlayground1                    Ready to start MyPlayground1
1  var thousandsOfIntegers = [Int]()  ~701
2
3  thousandsOfIntegers.append(0)      [0]
4  thousandsOfIntegers.append(1)      [0,1]
5  thousandsOfIntegers.append(2)      ()
6
7                             705
8  thousandsOfIntegers.removeAll()    []
9                                      ↑
10 for i in 0..<20 {                  709
11     thousandsOfIntegers.append(i)  (1000 times)
12 }
13
14
15 thousandsOIntegers                 [0,1,2,3,4,5,6,7,8,9,10,....
16
   707
```

FIG. 7H

```
MyPlayground1
 > ■ MyPlayground1                Ready to start MyPlayground1
 1  var thousandsOfIntegers = [Int]()    701
 2
 3  thousandsOfIntegers.append(0)           [0]
 4  thousandsOfIntegers.append(1)           [0,1]
 5  thousandsOfIntegers.append(2)           ()
 6
 7                                  705
 8  thousandsOfIntegers.removeAll()         []
 9                                            ↑
10  for i in 0..<20| {                      709
11      thousandsOfIntegers.append(i)       (1000 times)
12  }
13
14  thousandsOfIntegers                     [0,1,2,3,4,5,6,7,8,9,10,...
15
16
       707  703
```

FIG. 7I

```
MyPlayground1
1  var thousandsOfIntegers = [Int]()           []
2
3  thousandsOfIntegers.append(0)               [0]
4  thousandsOfIntegers.append(1)               [0,1]
5  thousandsOfIntegers.append(2)               [0,1,2]
6
7
8  thousandsOfIntegers.removeAll()             []
9
10 for i in 0..<20 {
11     thousandsOfIntegers.append(i)           (20 times)
12 }
13
14 thousandsOfIntegers                         [0,1,2,3,4,5,6,7,8,9,10,1.
15
16
```

FIG. 8A

```
 1 var thousandsOfIntegers = [Int]()  ← 701        []
 2
 3 thousandsOfIntegers.append(0)                    [0]
 4 thousandsOfIntegers.append(1)                    [0,1]
 5 thousandsOfIntegers.append(2)                    ()  ← 709
 6 }
 7
 8 thousandsOfIntegers.removeAll()
 9
10 for i in 0..<20 {
11     thousandsOfIntegers.append(i)  ← 705
12 }
13
14 thousandsOfIntegers
```

Ready to continue MyPlayground1

SOFTWARE DEVELOPMENT ENVIRONMENT WITH COMPILATION AND READ-EVALUATE-PRINT-LOOP OPERATIONS

This application claims the benefit of priority to U.S. Provisional Patent Application No. 62/679,877, filed Jun. 3, 2018, which application is hereby incorporated herein by reference.

BACKGROUND

Many modern programming languages require advanced editing and compiling software in order to edit, debug, and compile source code. In some development environments, a software developer generally engages in several manual steps before testing new code. For example, in a typical development lifecycle, source code must be separately edited, compiled, and executed before debugging can commence. To enhance the task of software development, software developers can develop software applications using an integrated development environment. An integrated development environment (IDE) is a software application that usually includes a source code editor, a compiler and/or interpreter, build automation tools, and a debugger. Examples of integrated development environments include Xcode from Apple Inc. of Cupertino Calif. and Visual Studio from Microsoft Corporation of Redmond, Wash. The editor of an integrated development environment can include features that facilitate moving between files and accessing related reference materials such as an application programming interface (API) definition. The source code editor of the integrated development environment can also include features that facilitate viewing and editing text data such as source code or XML and checking the text data.

In the case of Xcode, a computer programmer can enter source code into the source code editor and then submit the source code to a compiler and then the compiler can display results of the output of the compiled and then executed computer program, and these results can be displayed in the integrated development environment. For example, these results can be displayed in a region of the source code editor.

Some software development tools also provide for outputs on a statement by statement basis. For example, some software development tools provide read-evaluate-print-loop (REPL) functionality. REPL functionality provides a display of results of a statement in the source code by evaluating the statement and executing the statement and then printing the result of the execution of the statement. This can allow the programmer to determine if the statement is generating the expected or desired result. The Basic interpreter is an example of a software development tool that provides REPL functionality. Jupyter Notebook from Jupyter Project is another example of a software development tool that can provide REPL functionality.

SUMMARY OF THE DESCRIPTION

The embodiments described herein include methods and systems for developing software that can perform both compilation operations and read-evaluate-print-loop (REPL) operations on source code. In one embodiment, an integrated development environment can include a source code editor and a compiler and can perform the following operations: receiving source code and performing REPL operations as the source code is received; receiving edits in the source code for which REPL operations have been performed, and compiling, by the compiler, the edited source code; and storing results of the execution of the edited source code for use in subsequent REPL operations. In this integrated development environment, the system can display results in the IDE from both execution of REPL operations as well as execution from compiled and executed program segments.

In one embodiment, a method can include the following operations: receiving a first set of source code; computing a first set of results that represent outputs from execution of the first set of source code and storing the first set of results for use by subsequently added source code when performing a read-evaluate-print-loop (REPL) operation; receiving a second set of source code, the second set of source code being subsequently added after the first set of source code; computing a second set of results that represent outputs from execution of the second set of source code, the second set of results being based on the stored first set of results (without having to re-compile and execute the first set of source code); receiving a request to edit source code in the first set of source code; compiling the edited first set of source code and computing a third set of results that represent outputs from execution of the edited first set of source code and storing the third set of results for use by subsequently added source code when performing a REPL operation. In one embodiment, the first set of source code and the second set of source code can be received by a source code editor in an integrated development environment for developing and compiling one or more computer programs. In one embodiment, the method can further include: computing a fourth set of results that represent outputs from execution of the second set of source code based on the third set of results. In one embodiment, the fourth set of results are computed without compiling the second set of source code, and the second set of results are computed without executing the compiled code from the first set of source code after storing the first set of results. In one embodiment, the integrated development environment performs the REPL operations and the compilations and displays the first set of results, the second set of results, the third set of results, and the fourth set of results. Moreover the IDE, in one embodiment, allows editing of source code for which REPL operations have been performed without having to retype the entire source code.

In one embodiment, the method can further include displaying, in the integrated development environment, an indicator that indicates what source code has or has not been submitted to the compiler for compilation. The method can further include receiving a selection within the source code editor to compile only a portion of the source code in the source code editor. In one embodiment, the indicator can be a compilation status indicator that indicates what source code has not been compiled.

The embodiments and systems described herein can include non-transitory machine readable media that store executable computer program instructions that can cause one or more data processing systems to perform the one or more methods described herein when the computer program instructions are executed by the one or more data processing systems. The instructions can be stored in non-volatile memory such as flash memory or other forms of memory such as DRAM.

The above summary does not include an exhaustive list of all embodiments in this disclosure. All systems and methods can be practiced from all suitable combinations of the various aspects and embodiments summarized above, and also those disclosed in the Detailed Description below.

BRIEF DESCRIPTION OF THE DRAWINGS

The embodiments are illustrated by way of example, and not limitation, in the figures of the accompanying drawings in which references with like numbers indicate similar elements.

FIGS. 7A, 7B, 7C, 7D, 7E, 7F, 7G, 7H, 7I, and 7J show examples of an embodiment of an integrated development environment.

FIGS. 8A and 8B show examples of an embodiment of an integrated development environment.

DETAILED DESCRIPTION

Figure 1:
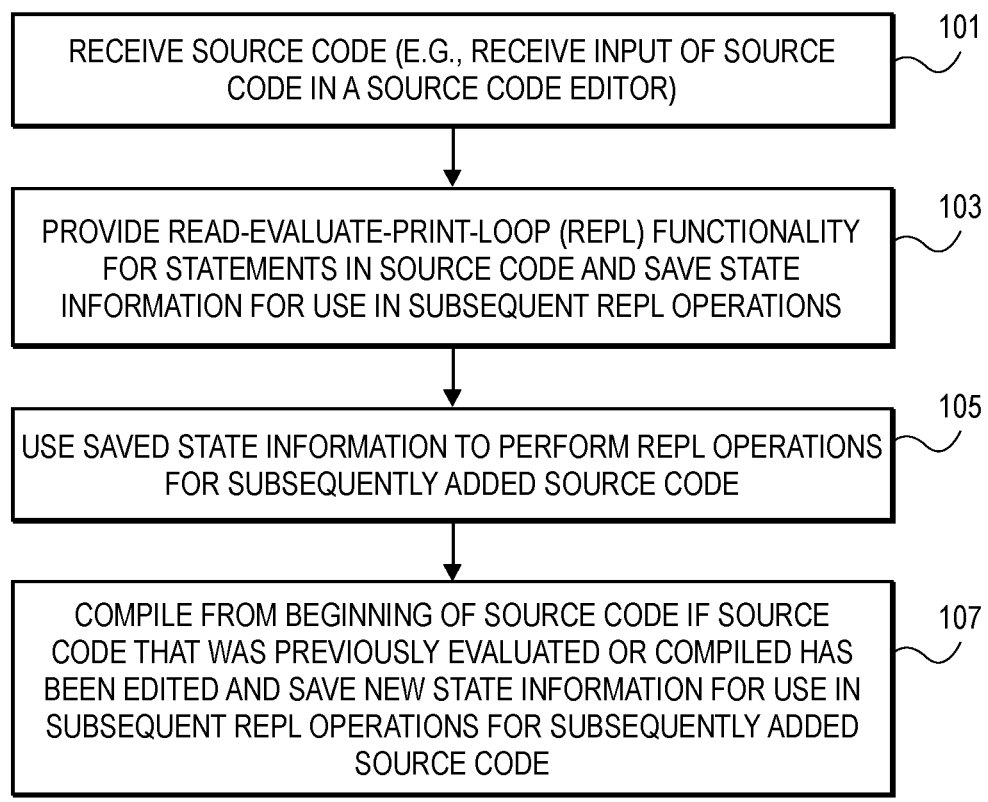
FIG. 1 is a flowchart which illustrates a method according to one embodiment.

Various embodiments and aspects will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments.

Reference in the specification to "one embodiment" or "an embodiment" means that a particular feature, structure, or characteristic described in conjunction with the embodiment can be included in at least one embodiment. The appearances of the phrase "in one embodiment" in various places in the specification do not necessarily all refer to the same embodiment. The processes depicted in the figures that follow are performed by processing logic that comprises hardware (e.g. circuitry, dedicated logic, etc.), software, or a combination of both. Although the processes are described below in terms of some sequential operations, it should be appreciated that some of the operations described may be performed in a different order. Moreover, some operations may be performed in parallel rather than sequentially.

This present application describes various embodiments in, for example, an integrated development environment which provides for the evaluation of each statement of computer program code as each statement is entered through the use of REPL operations and also provides for compilation of the computer program code all within the same integrated development environment. This allows for interactive development of the computer program which enables experimentation with algorithms and system provided application programming interfaces (APIs) in a standard development environment.

Exemplary source code is illustrated and described that is consistent with computer program instructions in the Swift programming language. However, embodiments are not limited to the use of the Swift programming language. The concepts described herein may also be applied to source code editors and integrated development environments having support for languages such as C, Objective-C, C++, Java, and/or any other programming language.

To provide a thorough explanation for the various embodiments, numerous specific details are set forth herein. However, one having ordinary skill in the art will understand that embodiments may be practiced without these specific details. In some instances, well-known components, structures, and techniques are not shown in detail to avoid obscuring details within this description. Reference herein to "one embodiment" or "an embodiment" indicate that a particular feature structure or characteristic described in connection or association with the embodiment can be included in at least one of such embodiments.

The processes depicted in the figures that follow are performed by processing logic that comprises hardware such as circuitry, dedicated logic, processing systems etc. and can include software, such as software stored on a non-transitory machine readable storage medium. Although the processes are described below in terms of some sequential operations, it will be appreciated that some of the operations described may be performed in a different order or in parallel.

The illustrations of graphical user interface images in the figures herein include material protected by copyright. The owner of the copyright, including the assignee of the present invention, hereby reserves its rights, including copyright, in these materials. The copyright owner has no objection to the facsimile reproduction by anyone of the patent document or the patent disclosure as it appears in the Patent and Trademark Office file or records, but otherwise reserves all copyrights whatsoever. Copyright Apple, Inc. 2018.

A method in one embodiment will now be described while referring to FIG. 1. This method can be performed in an integrated development environment. That integrated development environment can receive in operation 101 source code, such as source code which is input by a programmer into a source code editor. In operation 103, the system can evaluate statements in the source code and can save state information generated by the evaluation for later use. For example, the system can use REPL functionality to evaluate statements in source code and can save state information (generated by executed REPL evaluation operations) for use in subsequent REPL operations when further source code is added. For example, a programmer can add a line of source code and the system can respond in operation 103 by using the REPL functionality which shows the result of the statement (which can be referred to as a REPL result) in a result panel or portion of a source code editor in one embodiment. Further, the system can save state information (e.g., values for variables, constants, etc.) about the statement entered by the programmer, which state information can be used in subsequent REPL operations for subsequently added source code. When the subsequently added source code is added, operation 105 can be performed; in operation 105 the saved state information (e.g., from prior executed REPL operations) is used to perform REPL operations for the subsequently added source code. In one embodiment, operations 101, 103, and 105 can repeat in a loop until operation 107 is performed when a compilation operation is performed in the integrated development environment in one embodiment. When these operations repeat in a loop, the programmer can repeatedly add line after line of source code and be provided with REPL results for each line of source code when possible. Typically, a REPL evaluation operation evaluates a single line of source code if the syntax of the programming language allows the line to be evaluated. A programmer can indicate the end of the line by pressing the return key or another key designated to end a line and start a new line. In some cases, multiple lines may be required before a statement or set of source code can be evaluated. Typically, a REPL evaluation operation can be performed when a source code statement is complete such as when an operation and the inputs to the operation have been specified.

While entering source code in the method shown in FIG. 1, the programmer may realize that previously entered source code in the source code editor needs to be edited. This source code may have already been evaluated or compiled. For example, the source code which needs to be edited may have been previously evaluated as part of a prior executed REPL operation. In one embodiment, the programmer can then instruct the system to compile the source code and the system can compile the source code from the beginning of the source code and also save new state information for use in subsequent REPL operations for subsequently added source code. In one embodiment, this compilation can occur without having to retype the prior source code other than entering edits in the prior source code. Thus a programmer can go back and edit previously evaluated (e.g., evaluated by one or more REPL operations) or compiled portions of the source code and then recompile the source code and cause at the same time the saving of new state information for use in subsequent REPL operations when subsequently added source code is added. The saving of new state information can also improve the speed for using the system because the subsequent REPL operations can be performed without recompiling the prior source code again; thus, a programmer spends less time waiting on the system to process new lines of code.

A method according to another embodiment now be described while referring to FIG. 3. In operation 301, a system can receive a first set of source code such as a line of source code; for example, a source code editor can receive the input of text (e.g., a line of source code) from a programmer where the text represents the source code of a computer program. In operation 303 the system can then respond by performing REPL evaluation operations and can save state information about the REPL evaluation operations for use in subsequently added source code when performing REPL operations for the subsequently added source code. Operations 301 and 303 can repeat over time in the loop as the programmer enters new source code and the system responds by performing REPL operations for the new source code, each time using saved state information from prior REPL operations to perform the REPL operations for the subsequently added source code. At some point, the programmer may desire to compile the program and in doing so may request the system to compile the program in operation 305. The system responds in operation 307 by compiling the computer program (which includes the first set of source code) and by saving state information for use in REPL operations for subsequently added source code which is added after the compilation of the computer program in operation 307. In one embodiment, the compilation of the computer program in operation 307 can produce a set of results which are displayed within the integrated development environment; for example the results can be displayed in a results panel or pane of a source code editor in the integrated development environment. After compiling the computer program in operation 307, the computer programmer may then add further source code which causes operation 309 in which the system receives the subsequently added source code which can be, for example, a second set of source code. The system can then use the saved information from prior REPL operations to perform REPL operations for the subsequently added source code which was received in operation 309. The use of saved state information from prior REPL operations allows the display of outputs of the results of new source code without having to re-compile the source code from the beginning of the source code. At this point in the method shown in FIG. 3, the programmer may realize that edits are required to the first set of source code (which was previously compiled) and as a result the system receives in operation 311 edits from the programmer to the first set of source code. The programmer can then request the system to compile the program again which results in operation 313 in which the compiler of the system recompiles the first set of source code. In one embodiment, the compiler may compile the first set of source code and not the second set of source code which has not been changed since the last set of REPL operations were performed. In one embodiment, the entry of the edits to the first set of source code in operation 311 can be performed without retyping the entire source code and hence only the edits themselves need to be entered into the source code rather than retyping the entire source code. The recompilation of the first set of source code in operation 313 can provide executable code which can generate state information about the REPL operations for the edited first set of source code, and this state information can be saved in operation 315 for use in operations for source code which is added after the first set of source code. In one embodiment, the state information can be generated as a result of executing the compiled computer program after it is recompiled in operation 313. In another embodiment, an interpreter which is part of the system can produce REPL operations during the recompilation process and save the state information from the REPL operations. In one embodiment, the saved state information from operation 315 can be used for later added code without recompiling the previously submitted code and without compiling the new code and without re-executing the code derived from the first set of source code.

Figure 2:
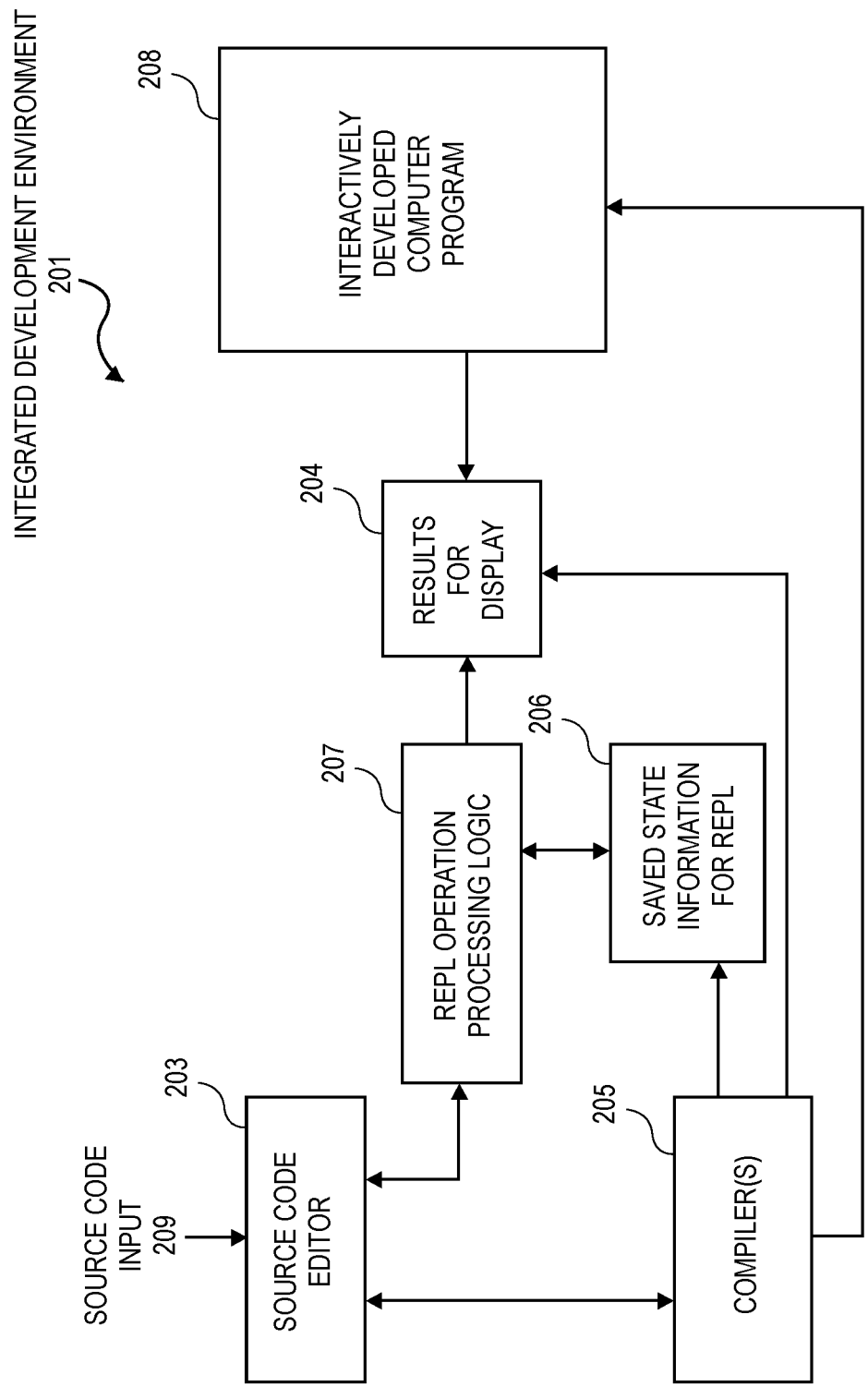
FIG. 2 shows, in block diagram form, an example of an integrated development environment according to one embodiment.
Figure 3:
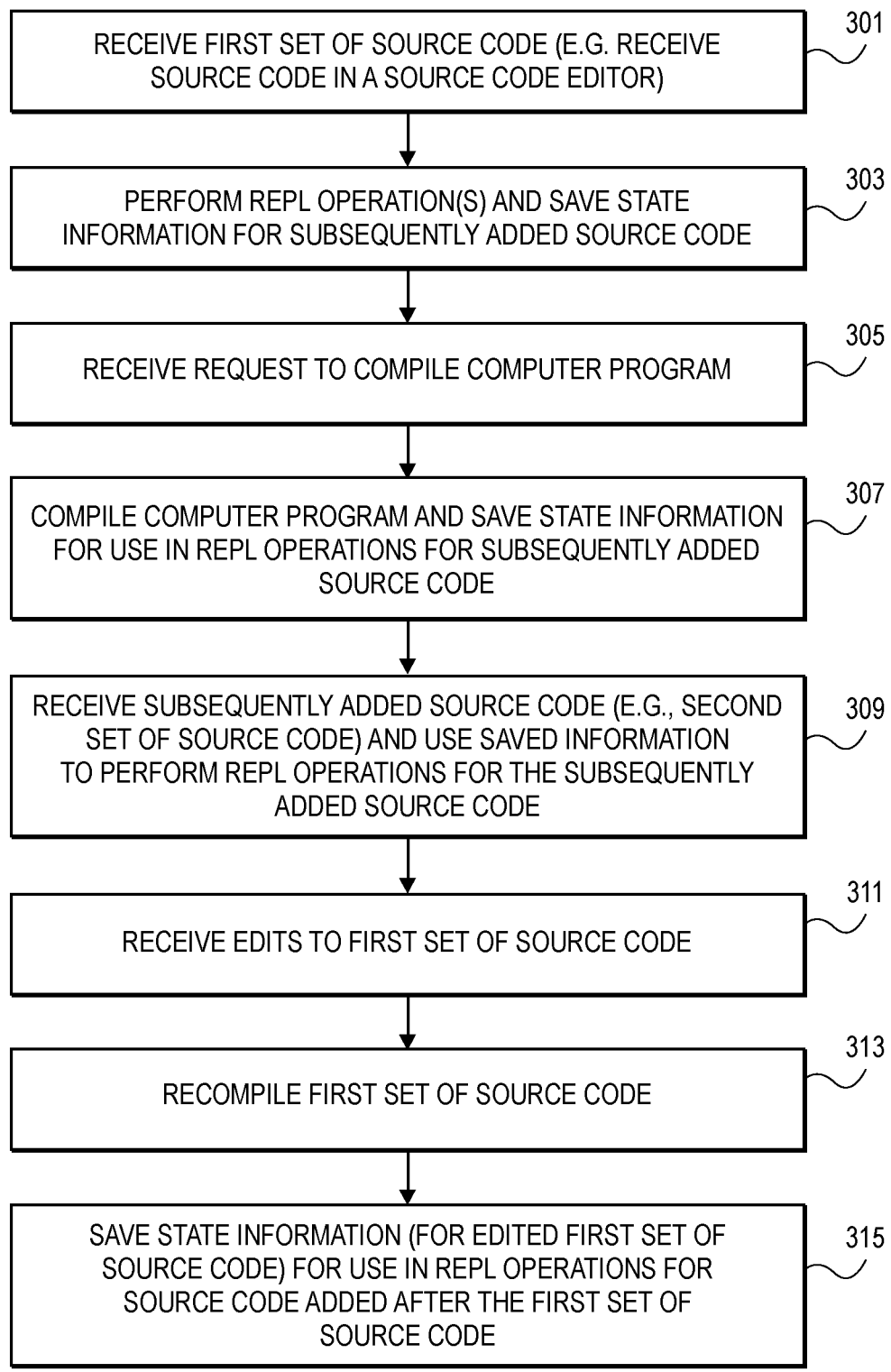
FIG. 3 is a flowchart which illustrates a method according to one embodiment.

FIG. 2 shows an example of an integrated development environment, such as integrated development environment 201 which can be used to perform any one of the embodiments described herein, such as the methods shown in FIG. 1 and in FIG. 3. The integrated development environment 201 can be implemented in software which executes on a data processing system such as a computer from Apple Inc. of Cupertino Calif. The data processing system may also be a different type of computer system. The integrated development environment 201 can be, for example, the Xcode integrated development environment which provides features that software developers can use to create, execute, and debug computer program code. In one or more embodiments, the integrated development environment 201 executes as an application process on the data processing system and is stored in memory on the data processing system in conjunction with an interactively developed program 208 which is being developed by using the integrated development environment 201 In one embodiment, the integrated development environment 201 and the interactively developed computer program 208 are both stored in memory on the data processing system, such as DRAM or in the virtual memory space of the data processing system. In one embodiment, the interactively developed application or computer program 208 can execute as an application process in a different memory address space than the application process of the integrated development environment 201, although in some implementations the interactively developed computer program 201 and the application process of the integrated development environment 201 can be combined in a single process or separate processes in the same memory address space. In one embodiment, the integrated development environment 201 can present a user interface which can include a source code editor provided by the source code editor 203. The source code editor 203 can be configured to receive source code input such as source code input 209 from a computer programmer using the integrated development environment 201. The source code editor 203 can provide for various functions such as spell-checking and other functions known in the art for source code editors. Examples of the user interface of source code editors are shown in FIGS. 7A through 7J and are also shown in FIGS. 8A and 8B. The source code editor can be coupled to one or more compilers, such as one or more compilers 205. The one or more compilers 205 can be configured to compile source code from the source code editor 203 and provide executable code such as the interactively developed computer program 208. When executed, the interactively developed computer program 208 can generate results for display, such as results 204 which can be displayed in one embodiment within a window such as a results pane or panel of the source code editor 203. In one embodiment, the integrated development environment 201 can dynamically compile and execute additional computer program instructions as the instructions are entered into the source code editor 203, enabling the interactively developed computer program 208 to be coded, executed, debugged, and re-coded in an interactive manner. In one embodiment, the one or more compilers 205 can include a front end compiler and a back end compiler. In one embodiment, the integrated development environment 201 uses a compilation system based on the LLVM (Low Level Virtual Machine) compiler infrastructure, although other compilation systems may be used. The front end compiler in one embodiment analyzes the program code to build an internal representation or intermediate expression of the program. The backend compiler can further compile the intermediate expression or the internal representation to create an expression which is executable on a particular processing system. In another embodiment, the one or more compilers 205 can be a single compiler which produces executable code resulting in the interactively developed computer program 208 being stored in memory for execution at runtime. The one or more compilers 205 can also generate, in one embodiment, the saved state information for future REPL operations and store that saved state information as saved state information 206 as shown in FIG. 2. In one embodiment, the one or more compilers 205 can generate results for display, such as the results 204 which are generated as a result of compiling the computer program or performing REPL operations in one embodiment.

In one embodiment, the integrated development environment 201 can also include REPL operation processing logic 207 which can perform REPL operations on source code received on a statement by statement basis. In other words, as each statement or line of source code is received, if the statement can be evaluated and produce a result of a REPL operation (a REPL result), the statement can be evaluated and the result can be printed or displayed as part of results 204 using the REPL operation processing logic 207 in one embodiment. The REPL operation processing logic 207 can be coupled to the source code editor 203 in one embodiment to receive source code statements on a line by line basis and produce outputs that represent the outputs of a REPL operation according to one embodiment. These outputs can be displayed as results 204 in a line by line basis associated with the corresponding line of source code or section of source code which produced the results of from the REPL operation. The REPL operation processing logic 207 can also generate and provide the state information for each REPL operation which is produced and cause that information to be saved as saved state information 206 for each REPL operation. This saved information is used for subsequent REPL operations by saving variable information data, constant data information and other information used to derive values for subsequently entered source code. In other words, the saved state information 206 can be used for subsequent REPL operations for subsequently entered source code so that there is no need to recompile or reexecute previously entered source code. In one embodiment, the REPL operation processing logic 207 can generate the results 204 and generate the state information to be saved as part of saved state information 206. In another embodiment, the REPL operation processing logic 207 can perform these operations without the assistance of the one or more compilers 205; in another embodiment, the one or more compilers 205 can also generate results for display such as the results 204 as well as provide saved state information 206 in addition to the results from the REPL operation processing logic 207.

Figure 4:
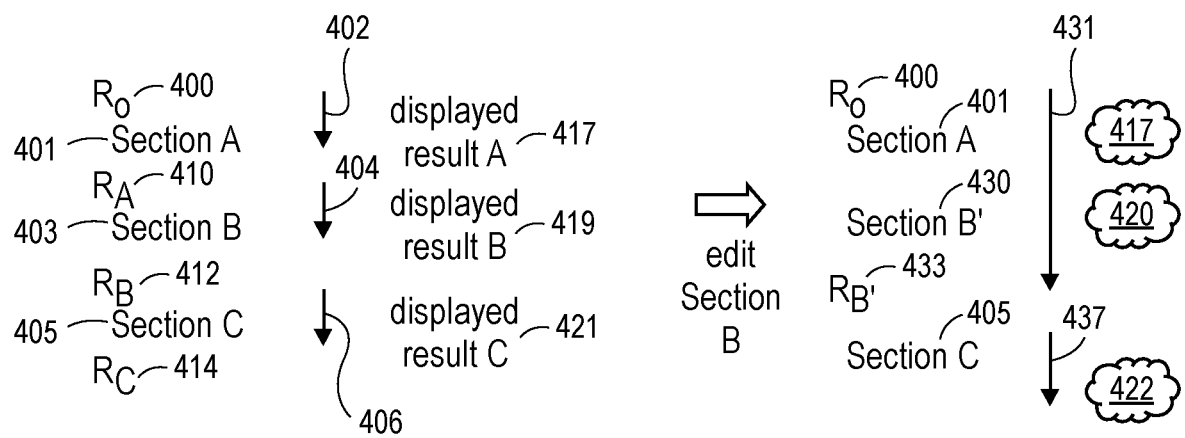
FIG. 4 shows an example of the execution of code after a portion of the source code has been edited during the development of the source code.
Figure 5:
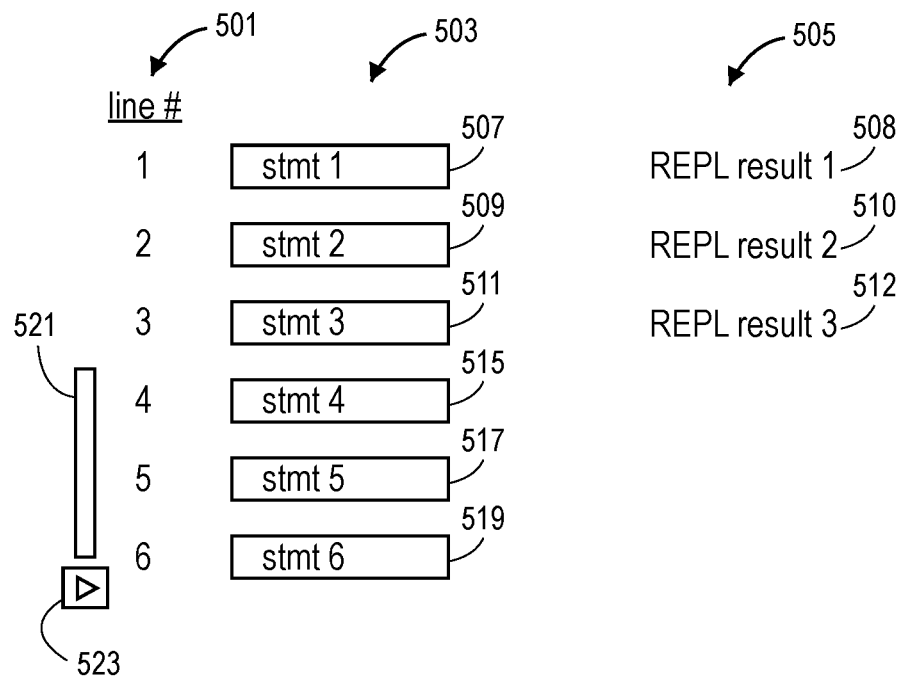
FIG. 5 shows an example of the development of source code and also shows a compilation status indicator.
Figure 6:
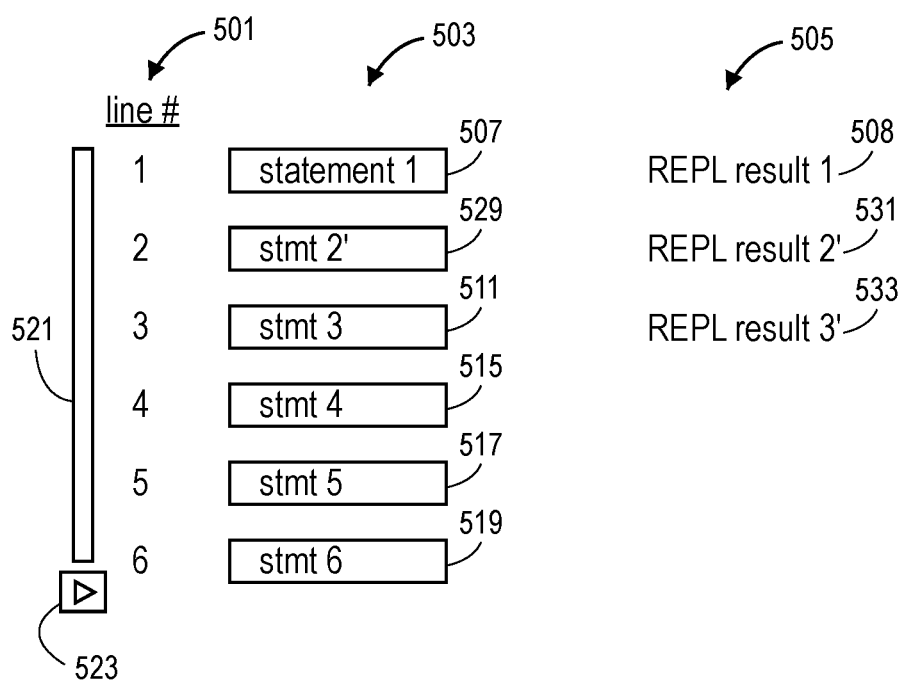
FIG. 6 shows an example of the compilation status indicator after a portion of the source code has been edited.

In one embodiment, the integrated development environment 201 can use the methods of either FIG. 1 or FIG. 3 to produce the examples shown in FIGS. 4, 5, and/or FIG. 6. In the example shown in FIG. 4, a set of source code sections is entered sequentially in time in a source code editor and the integrated development environment is configured to provide through a set of REPL operations the displayed results from the sections of source code which are entered. In one embodiment, the sections may be a single line of source code while in other embodiments the sections may be multiple lines of source code depending on when it is possible to generate REPL results from the source code. Referring now to FIG. 4, it can be seen that three sections of source code can be entered over time beginning with section 401 which is a section of source code which can be one or more lines of source code. After source code section 401 is entered into a source code editor, the programmer enters source code section 403 and then enters source code section 405. In one embodiment, the integrated development environment can include a REPL operation processing logic which can cause the execution of each section of source code to cause the display of outputs from each section of source code which can be displayed within the source code editor immediately after the entry of the corresponding section of source code. For example, entry of the source code section 401 (which can begin with state information 400) can produce through execution 402 by REPL processing logic (such as REPL processing logic 207), a displayed result 417 which can be displayed within the source code editor before entry of source code section 403; execution 402 can also produce state information 410 which is used in subsequent REPL operations. Similarly, entry of source code section 403 can (through the execution 404 by a REPL processing logic) produce the displayed result 419 which can also be displayed in the source code editor before entry of source code section 405. The execution 404 by the REPL processing logic can also produce the state information 412 which is used in subsequent REPL operations and state information 412 which is based upon a set of state information describing the states of the variables and other data prior to the execution 404. The result of execution 404 by the REPL processing logic is based upon state information 410 which is derived from execution of the source code section 401. Entry by the computer programmer of source code section 405 can use the state information 412 to calculate through a REPL operation the displayed result 421 based upon the state information 412 from prior REPL operations. In one embodiment, the REPL operation which produces the displayed result 421 is produced by execution 406 which is based upon the saved state information 412.

During the development of the computer program which includes source code sections 401, 403, and 405, the programmers may realize that they need to edit source code section 403. The editing of source code section 403 results in source code section 430. In one embodiment, the programmers can decide to recompile and execute just a portion of the source code beginning with source code section 401 and ending with the end of source code section 430 to derive state information 433 which can be used in subsequent REPL operations, such as REPL operations for source code section 405. Execution 437 can be a REPL operation which uses those prior saved state information such as state information 433 which is based upon the execution 431 shown in FIG. 4. Execution 431 can be, in one embodiment, an execution by a compiled program which is compiled at least from the beginning of section 401 through the end of section 430, where the end of section 430 represents the end of the revised source code section 430 derived from source code section 403 after the revisions to that source code section 403. In one embodiment, the integrated development environment can display the displayed result 417 as well as displaying the modified display results 420 and 422 based upon the revisions in section B which is shown as source code section 430 in FIG. 4. Thus, the revisions to a portion of the source code can be recompiled or compiled for the first time and derive both compiled results that are displayed such as result 420 as well as deriving saved state information such as state information 433 which can be used in subsequent REPL operations, such as the execution 437 which can be a REPL operation that computes the result 422 that is displayed in the integrated development environment based upon the state information 433. In one embodiment, execution 431 can stop at the end of the source code section 430 if the compiler can determine that section 405 has remained constant since the edits to section 403 which resulted in section 430. In this case the IDE can save time by not having to compile the entire source code and can stop compilation and execution of the newly compiled code at the end of section 430, and then the IDE can use the saved state information 433 to compute, through REPL operations, the REPL results for subsequent sections of source code. Thus execution 437 can be a REPL operation for source code section 405 that uses saved state information 433 to derive the result 422 for source code section 405.

FIGS. 5 and 6 show an example of a user interface of the source code editor that can be in an integrated development environment according to one embodiment. This user interface can be implemented using the integrated development environment 201 shown in FIG. 2, and this user interface can result from the implementation of one of the methods shown in FIG. 1 or 3. Column 501 in the user interface is a column of line numbers showing for each line the number of the line for a particular statement in the source code. Column 503 shows the inputted source code which includes six statements 507, 509, 511, 515, 517, and 519 in this example. Each statement is associated with a particular line number as shown in FIG. 5. Results column 505 shows the results of REPL operations for three of the statements in the example shown in FIG. 5. In particular, results column 505 shows results 508, 510, and 512. Result 508 is the result of a REPL operation for statement 507. Result 510 is the result of a REPL operation for statement 509. Result 512 is the result of a REPL operation for statement 511. Results may not be available for statements 515, 517, and 519 because these statements may not have sufficient information for a REPL processing logic to produce REPL results. The user interface also includes a compilation status indicator 521 and a compilation command icon 523. The compilation status indicator 521 can indicate what has or has not been compiled so far in the development of the computer program. In the example shown in FIG. 5, the compilation status indicator 521 shows what source code has not been compiled by the compiler; hence, statements 507, 509, and 511 have been compiled by the compiler while statements 515, 517, and 519 have not yet been compiled by the compiler. The developer can cause the system to compile statements 515, 517, and 519 by selecting the compilation command icon 523. In one embodiment, the selection may occur by touching the command icon 523 or by positioning a cursor, such as a mouse's cursor over the icon 523 and selecting the icon. In an alternative embodiment, the compilation status indicator can indicate what source code has been compiled so far in the development of the computer program rather than showing what has not been compiled. During the development of the computer program, the programmer may realize that statement 509 should be edited. The result of the edit, as shown in FIG. 6, causes the system to receive the edited source code which is now statement 529 and also causes the system to revise the compilation status indicator 521 by showing that all lines of the source code have not been submitted to the compiler due to the revision which created statement 529. In the example shown in FIG. 6, the REPL processing logic can produce REPL results as shown in FIG. 6 which include modified REPL results 531 and 533 due to the modifications of the source code in statement 529. By selecting the compilation command icon 523 the programmer can cause the system to compile the computer program from start to end as shown in FIG. 6. In the example shown in FIG. 6, the integrated development environment recognizes that the source code that was previously generated based upon statement 509 will need to be revised and hence the entire computer program in this example will need to be recompiled again to capture the changes that were made in statement 509 to generate statement 529.

Figure 7C:
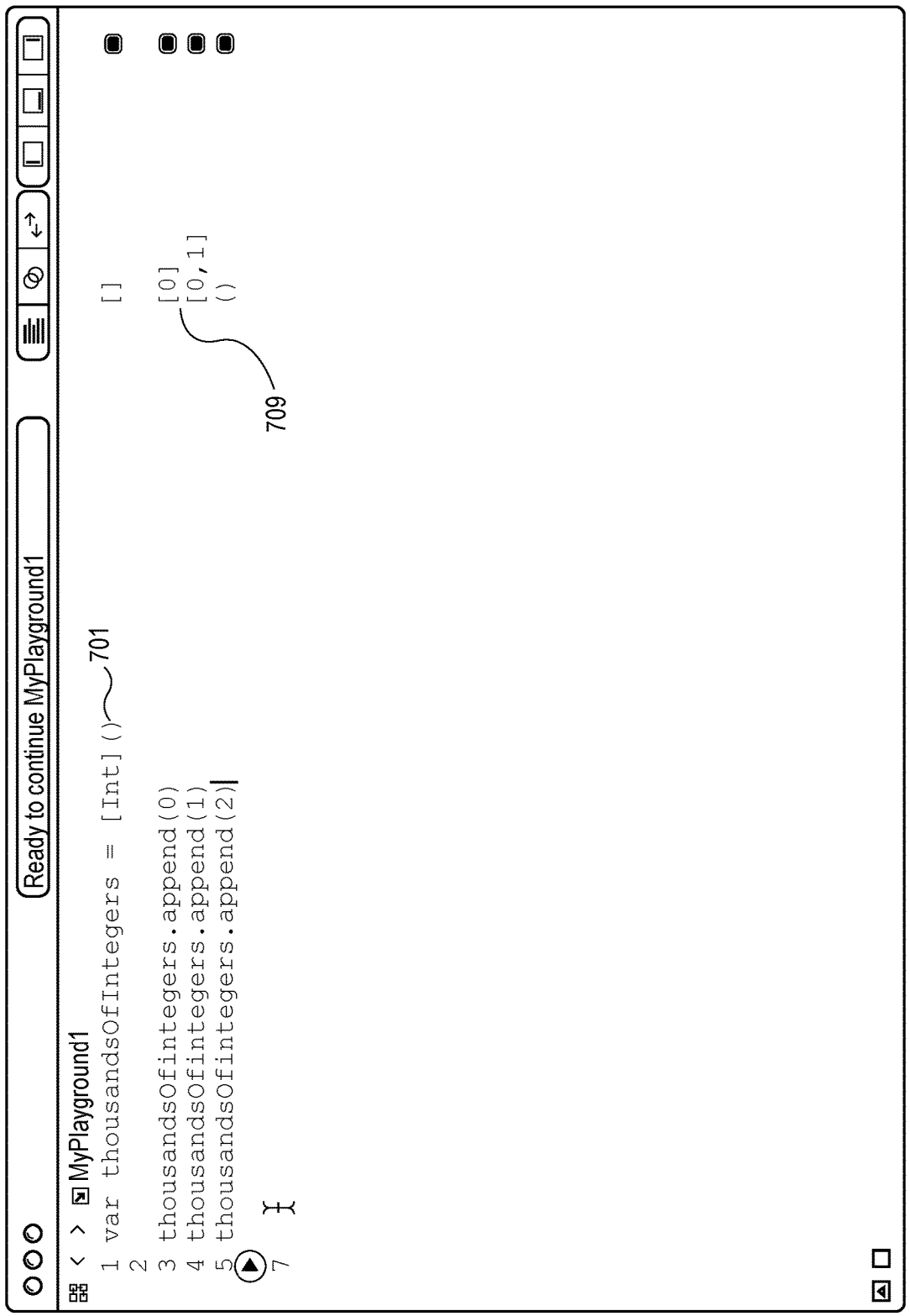
Figure 7G:
Figure 7J:
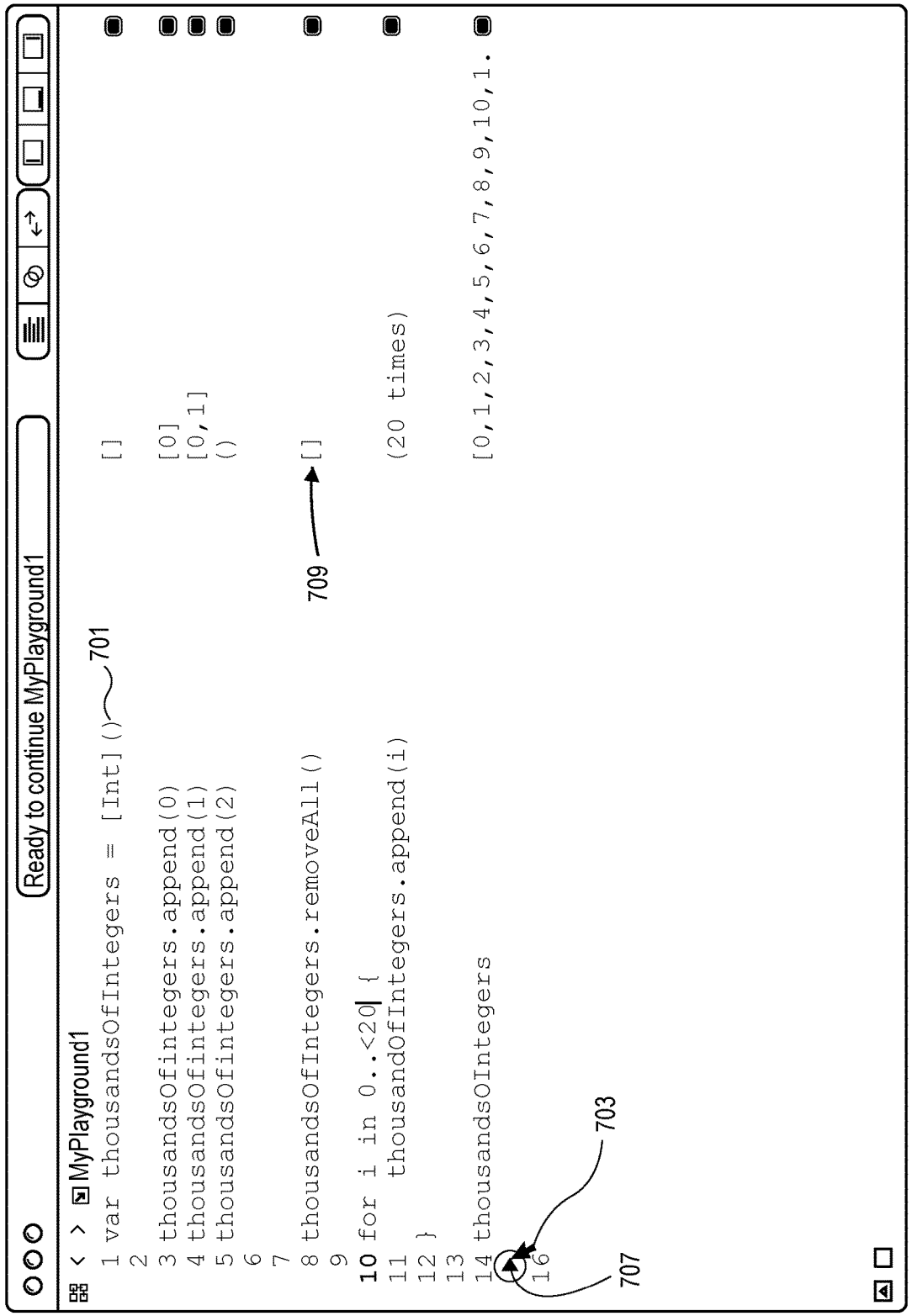

FIGS. 7A, 7B, 7C, 7D, 7E, 7F, 7G, 7H, 7I, and 7J show examples of a user interface of a source code editor that can be in an integrated development environment according to one embodiment. This user interface can be implemented using the integrated development environment 201 in FIG. 2, and this user interface can result from the implementation of one of the methods shown in FIG. 1 or 3. FIG. 7A shows the programmer has entered one line of source code which is statement 701 shown in line 1 of the source code. The user interface also includes a cursor 703 which can be controlled by a mouse or other control device as is known in the art. FIG. 7B shows that the programmer has added three more lines of code. In particular, lines 3, 4 and 5 have been added and the system has displayed results in a results panel 709 where results from REPL operations and/or the execution of compiled computer programs are shown. In the example shown in FIG. 7B, the entire source code has not been compiled and this is indicated by the compilation status indicator 705. The user interface also includes a compilation command icon 707 which can be similar to the compilation command icon 523 shown in FIGS. 5 and 6. Moreover, the compilation status indicator 705 can be similar to the compilation status indicator 521 shown in FIGS. 5 and 6. As shown in FIG. 7B, the programmer after entering three more lines of source code has positioned the mouse's cursor over the compilation command icon 707 and can then select the compilation command icon 707 to cause compilation of the source code which is been entered so far during the development of the computer program. The selection of the compilation command icon 707 results in the user interface shown in FIG. 7C in which the system has compiled all of the source code presented so far by the programmer. The compilation status indicator 705 does not appear in FIG. 7C because all of the source code has been compiled so far in the development of the computer program. Then, as shown in FIG. 7D, the programmer adds two more lines of code. Then as shown in FIG. 7E, the programmer adds additional lines of code resulting in 14 lines of code being displayed as shown in FIG. 7E. The compilation status indicator 705 shows that lines 6 through 14 have not been compiled while lines 1 through 5 have been compiled. The programmer can then cause the compilation of lines 6 through 14 by selecting the compilation command icon 707 as shown in FIG. 7E which produces the results shown in FIG. 7F in which all lines of the source code have been compiled again. The results panel 709 shown in FIG. 7F has been updated to show the updated results as a result of the compilation of the entire computer program. At this point in the development of the computer program, the programmer realizes that line 10 needs to be edited to change the number of times that execution is run in a particular loop. FIGS. 7G and 7H show the results of the edit being performed by the programmer to change the value 1000 in line 10 to the value 20 as shown in FIGS. 7G and 7H. The result of this change is shown in FIG. 7I, and the compilation status indicator 705 reappears in FIG. 7I to show that the entire computer program can be recompiled again and because of the change needs to be recompiled again. The programmer can select the compilation command icon 707 to cause recompilation of the entire computer program which results in the display shown in FIG. 7J in which the entire computer program has been recompiled and the results panel 709 has been updated to reflect the updated results from the execution of the recompiled computer program.

FIGS. 8A and 8B show another example of a user interface of a source code editor that can be in an integrated development environment according to one embodiment. This user interface can be implemented using the integrated development environment 201 shown in FIG. 2, and this user interface can result from the implementation of one of the methods shown in FIG. 1 or 3. FIGS. 8A and 8B represent an embodiment in which the integrated development environment allows a programmer to select only a portion of the computer program for compilation at any one time. In the example shown in FIG. 8A, the compilation status indicator 705 shows that all of the source code has not been compiled but the computer programmer has decided to compile only the five first lines of the computer program while leaving the remainder of the computer program not compiled. The computer programmer can select the compilation command icon 707 shown in FIG. 8A and thereby cause the compilation of only the first five lines of the computer program resulting in the user interface shown in FIG. 8B after the first five lines have been compiled. The computer programmer in one embodiment can move the cursor 703 up and down the compilation status indicator 705 to select the point at which to cause a partial compilation of the computer program. For example, the computer programmer can move the cursor 703 up and down the compilation status indicator to pick different points for partial compilation such as line 8 instead of line 5. The results of partial compilation and execution of the computer program can be provided to the REPL processing logic to produce REPL saved state information for REPL operations which follow the compiled portion of the computer program. The ability to select portions of the program for compilation and have those portions provide saved information for REPL processing operations of subsequent source code provides added flexibility in the integrated development environment for the computer programmer and can also reduce compilation times by limiting the amount of code that is compiled at any one time.

Figure 9:
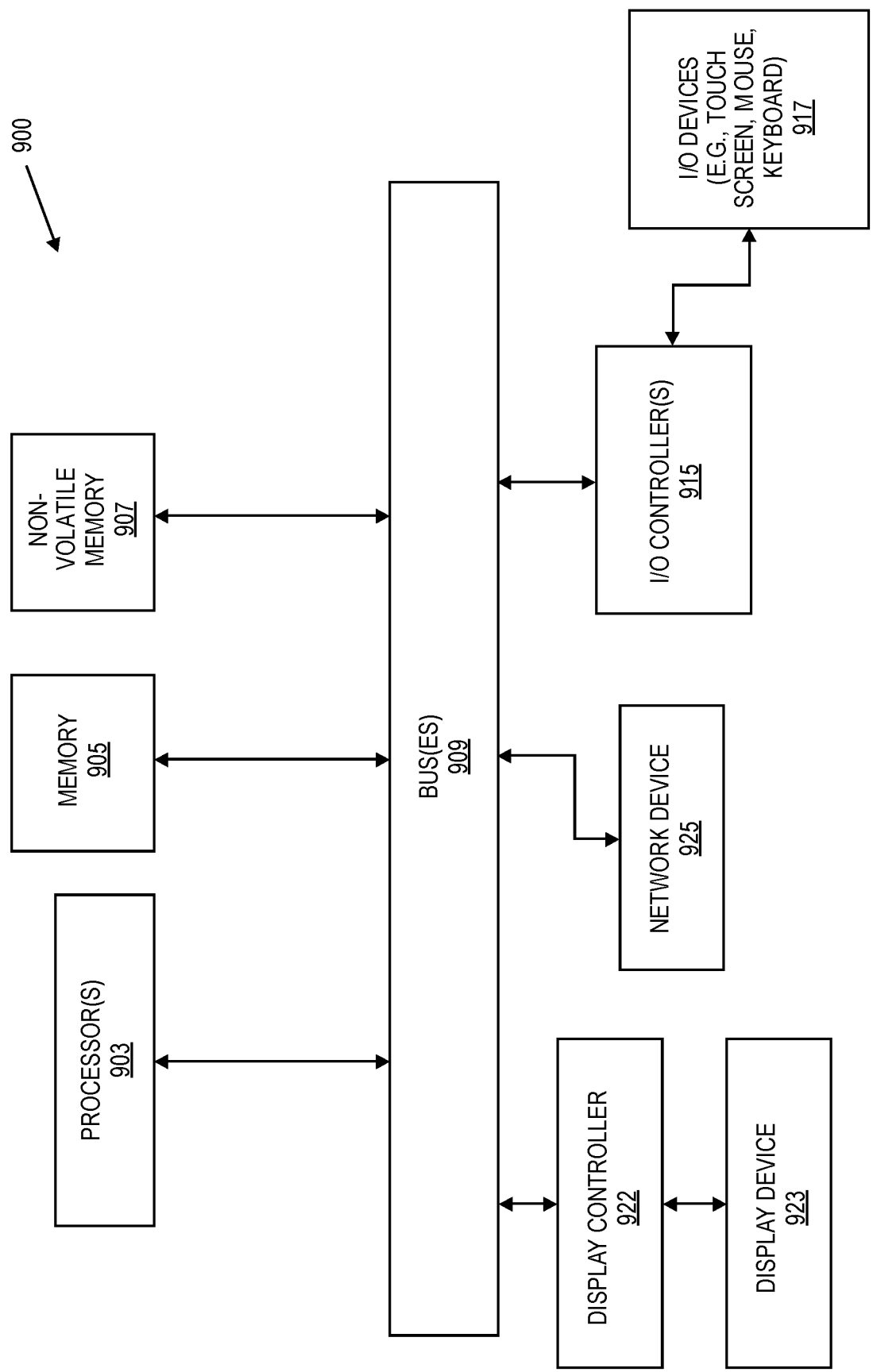
FIG. 9 shows in block diagram form an example of a data processing system which can be used with one or more embodiments described herein.

FIG. 9 is a block diagram of a data processing system 900 according to an embodiment. Note that while FIG. 9 illustrates the various components of a data processing system that may be incorporated into a mobile or handheld device, it is not intended to represent any particular architecture or manner of interconnecting the components as such details are not germane to the present invention. It will also be appreciated that other types of data processing systems that have fewer components than shown or more components than shown can also be used within the various embodiments.

The data processing system 900 includes one or more bus(es) 909 that serve to interconnect the various components of the system. One or more processor(s) 903 are coupled to the one or more bus(es) 909 as is known in the art. Memory 905 may be volatile DRAM or non-volatile RAM, such as NOR flash memory or other types of high-speed, non-volatile, execute-in-place memory. This memory can be coupled to the one or more bus(es) 909 using techniques known in the art. The data processing system 900 can also include explicitly non-volatile memory 907, such as data storage devices including one or more hard disk drives, flash memory devices or other types of memory systems that maintain data after power is removed from the system. The non-volatile memory 907 and the memory 905 can each couple to the one or more bus(es) 909 using known interfaces and connection techniques. A display controller 922 can couple to the one or more bus(es) 909 to receive display data, which can be displayed on a display device 923. In one embodiment the display device 923 includes an integrated touch input to provide a touch screen.

The data processing system 900 can also include one or more input/output (I/O) controllers 915 which provide interfaces for one or more I/O devices, such as one or more mice, touch screens, touch pads, and other input devices including those known in the art and output devices (e.g. speakers). The input/output devices 917 are coupled through one or more I/O controllers 915 as is known in the art.

While the data processing system 900 illustrates the memory 905 and non-volatile memory 907 as coupled to the one or more buses directly, in one embodiment the non-volatile memory 907 can be remote from the data processing system 900, such as in a network storage device which is coupled to the data processing system through a network interface such as a modem, wireless LAN, or Ethernet interface. The bus(es) 909 can be connected to each other through various bridges, controllers and/or adapters as is well known in the art. In one embodiment the I/O controller 915 includes one or more of a USB (Universal Serial Bus) adapter for controlling USB peripherals or a Thunderbolt controller for controlling Thunderbolt peripherals. In one embodiment, one or more network device(s) 925 can be coupled to the bus(es) 909. The network device(s) 925 can be wired network devices (e.g., Ethernet) or wireless network devices (e.g., WI-FI, Bluetooth).

It will be apparent from this description that embodiments and aspects of the present invention may be embodied, at least in part, in software. That is, the techniques and methods may be carried out in a data processing system or set of data processing systems in response to the processors executing a sequence of instructions stored in a storage medium, such as a non-transitory machine readable storage media, such as volatile DRAM or nonvolatile flash memory. In various embodiments, hardwired circuitry may be used in combination with software instructions to implement the embodiments described herein. Thus the techniques and methods are not limited to any specific combination of hardware circuitry and software, or to any particular source for the instructions executed by the one or more data processing systems.

In the foregoing specification, specific exemplary embodiments have been described. It will be evident that various modifications may be made to those embodiments without departing from the broader spirit and scope set forth in the following claims. The specification and drawings are, accordingly, to be regarded in an illustrative sense rather than a restrictive sense.

What is claimed is:

1. A method in an integrated development environment for developing a computer program, the method comprising:
   displaying a source code editor that is part of an integrated development environment for developing and compiling one or more computer programs;
   receiving a first line of source code;
   computing a first set of results that represent outputs from execution of the first line of source code and storing the first set of results for use by subsequently added source code when performing a read-evaluate-print-loop (REPL) operation;
   receiving a second line of source code, the second line of source code being subsequently added after the first line of source code;
   computing a second set of results that represent outputs from execution of the second line of source code, the second set of results based on the stored first set of results;
   receiving a request to edit source code in the first line of source code;
   compiling the edited first line of source code and computing a third set of results that represent outputs from execution of the edited first line of source code and storing the third set of results for use by subsequently added source code when performing a REPL operation;
   wherein the second set of results are computed without executing the first line of source code after storing the first set of results; and wherein the first line of source code and the second line of source code are received by the source code editor that is part of the integrated development environment that also includes a compiler that compiles the edited first line of source code, and the integrated development environment performs the REPL operations and displays the first set of results, the second set of results, and the third set of results;
   displaying, in the integrated development environment, an indicator that indicates what source code has or has not been submitted to the compiler for compilation, wherein the indicator is a vertical bar along a side of the source code;
   displaying a compile icon along the indicator, the compile icon moving up and down along the indicator in response to vertical cursor movement, the compile icon allowing a programmer to select only a portion of the source code to be compiled.

2. A non-transitory machine readable medium storing executable instructions which when executed by a data processing system cause the data processing system to perform a method comprising:
   displaying a source code editor that is part of an integrated development environment for developing and compiling one or more computer programs; receiving a first line of source code;
   computing a first set of results that represent outputs from execution of the first line of source code and storing the first set of results for use by subsequently added source code when performing a read-evaluate-print-loop (REPL) operation;
   receiving a second line of source code, the second line of source code being subsequently added after the first line of source code;
   computing a second set of results that represent outputs from execution of the second line of source code, the second set of results based on the stored first set of results;
   receiving a request to edit source code in the first line of source code;
   compiling the edited first line of source code and computing a third set of results that represent outputs from execution of the edited first line of source code and storing the third set of results for use by subsequently added source code when performing a REPL operation;
   wherein the second set of results are computed without executing the first line of source code after storing the first set of results; and wherein the first line of source code and the second line of source code are received by the source code editor that is part of the integrated development environment that also includes a compiler that compiles the edited first line of source code, and the integrated development environment performs the REPL operations and displays the first set of results, the second set of results, and the third set of results;
   displaying, in the integrated development environment, an indicator that indicates what source code has or has not been submitted to the compiler for compilation, wherein the indicator is a vertical bar along a side of the source code;
   displaying a compile icon along the indicator, the compile icon moving up and down along the indicator in response to vertical cursor movement, the compile icon allowing a programmer to select only a portion of the source code to be compiled.

3. A non-transitory machine readable medium storing executable instructions which when executed by a data processing system cause the data processing system to perform a method comprising:
   receiving a first set of source code;
   computing a first set of results that represent outputs from execution of the first set of source code and storing the first set of results for use by subsequently added source code when performing an evaluation operation;

receiving a second set of source code, the second set of source code being subsequently added after the first set of source code, wherein the first set of source code and the second set of source code are received by a source code editor in an integrated development environment for developing and compiling one or more computer programs;

computing a second set of results using the stored first set of results without re-executing the first set of source code, wherein the second set of results represent outputs from execution of the second set of source code;

receiving, after the computing of the second set of results, a request to edit at least a portion of the source code in the first set of source code;

displaying, in the integrated development environment, an indicator that indicates what source code of the first set of source code has not been submitted to a compiler for compilation; and compiling the edited portion of the source code in the first set of source code and computing a third set of results that represent outputs from execution of the edited first set of source code and storing the third set of results for use by subsequently added source code when performing a subsequent evaluation operation.

4. The medium as in claim 3, wherein the method further comprises:
computing a fourth set of results that represent outputs from execution of the second set of source code based on the third set of results and wherein the evaluation operation is a read-evaluate-print-loop (REPL) operation and the subsequent evaluation operation is a REPL operation.

5. The medium as in claim 4, wherein the fourth set of results are computed without compiling the second set of source code.

6. The medium as in claim 5, wherein the second set of results are computed without executing the first set of source code after storing the first set of results.

7. The medium as in claim 6, wherein the first set of source code and the second set of source code are received by a source code editor that is part of an integrated development environment that also includes a compiler that compiles the edited first set of source code, and the integrated development environment performs the REPL operations and displays the first set of results, the second set of results, the third set of results and the fourth set of results.

8. A method comprising:
receiving a first set of source code;
computing a first set of results that represent outputs from execution of the first set of source code and storing the first set of results for use by subsequently added source code when performing an evaluation operation;
receiving a second set of source code, the second set of source code being subsequently added after the first set of source code, wherein the first set of source code and the second set of source code are received by a source code editor in an integrated development environment for developing and compiling one or more computer programs;
computing a second set of results using the stored first set of results without having to re-execute the first set of source code, wherein the second set of results represent outputs from execution of the second set of source code;
receiving a request to edit at least a portion of the source code in the first set of source code; and displaying, in the integrated development environment, an indicator that indicates what source code of the first set of source code has not been submitted to a compiler for compilation;
compiling the edited portion of the source code in first set of source code and computing a third set of results that represent outputs from execution of the edited first set of source code and storing the third set of results for use by subsequently added source code when performing a subsequent evaluation operation.

9. The method as in claim 8, wherein the method further comprises:
computing a fourth set of results that represent outputs from execution of the second set of source code based on the third set of results and wherein the evaluation operation is a read-evaluate-print-loop (REPL) operation and the subsequent evaluation operation is a REPL operation.

10. The method as in claim 9, wherein the fourth set of results are computed without compiling the second set of source code.

11. The method as in claim 10, wherein the second set of results are computed without executing the first set of source code after storing the first set of results.

12. The method as in claim 11, wherein the first set of source code and the second set of source code are received by a source code editor that is part of an integrated development environment that also includes a compiler that compiles the edited first set of source code, and the integrated development environment performs the REPL operations and displays the first set of results, the second set of results, the third set of results and the fourth set of results.

13. An integrated development environment system for developing a computer program, the system comprising:
a memory;
a source code editor, stored in the memory, to receive a first set of source code;
processing logic, coupled to the memory, to compute a first set of results that represent outputs from execution of the first set of source code and storing the first set of results for use by subsequently added source code when performing an evaluation operation;
the source code editor to receive a second set of source code, the second set of source code being subsequently added after the first set of source code, wherein the first set of source code and the second set of source code are received by the source code editor in the integrated development environment for developing and compiling one or more computer programs;
the processing logic to compute a second set of results using the stored first set of results without re-executing the first set of source code, wherein the second set of results represent outputs from execution of the second set of source code;
the source code editor to receive, after the computing of the second set of results, a request to edit at least a portion of the source code in the first set of source code;
the source code editor coupled to a display to provide an indicator that indicates what source code of the first set of source code has not been submitted to a compiler for compilation; and
the compiler to compile the edited portion of the source code in the first set of source code and computing a third set of results that represent outputs from execution of the edited first set of source code and storing the third set of results for use by subsequently added source code when performing a subsequent evaluation operation.

* * * * *